Oct. 9, 1928.
A. P. WOOD
STORAGE BATTERY
Filed April 30, 1927
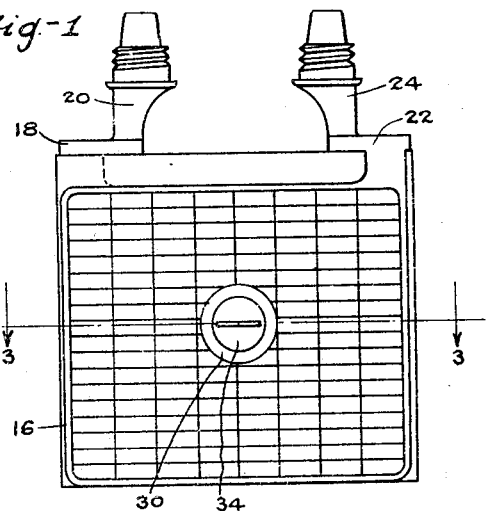
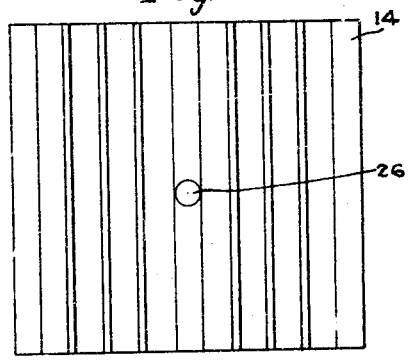
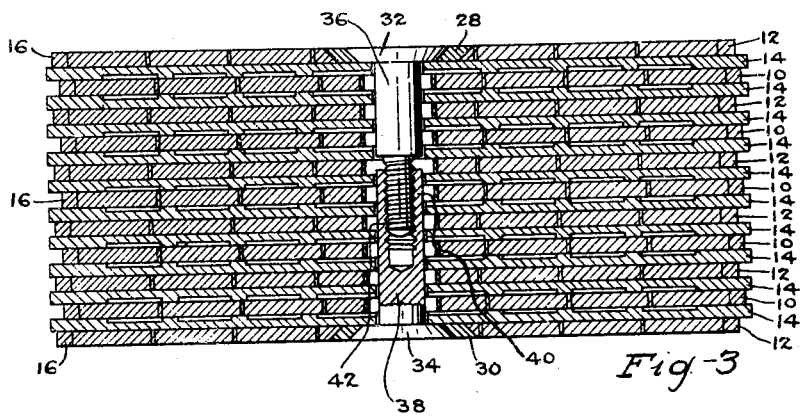
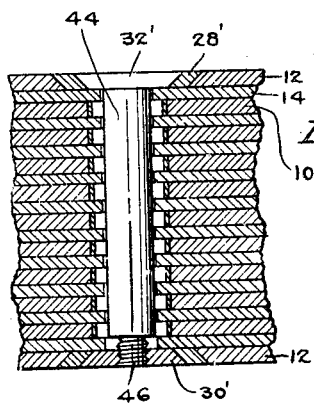
Inventor:
Alfred P. Wood.
By Whiteley and Ruckman
Attorneys.

Patented Oct. 9, 1928.

1,687,416

UNITED STATES PATENT OFFICE.

ALFRED P. WOOD, OF MINNEAPOLIS, MINNESOTA, ASSIGNOR OF FORTY-NINE ONE-HUNDREDTHS TO FRANCIS L. MURRAY, OF MINNEAPOLIS, MINNESOTA.

STORAGE BATTERY.

Application filed April 30, 1927. Serial No. 187,843.

My invention relates to storage batteries and an object is to provide means which tends to eliminate plate buckling and which also tends to prevent the plate separators from wearing out due to plates rubbing against the separators. It is well-known that as a motor vehicle bounces and bounds over the road the battery is constantly bounding, with the result that the elements in the battery are subjected to vibration and wear. The positive and negative plates in the cell constantly rub the separators. After the separators become worn so as to no longer afford sufficient support for the plates, the latter buckle in the center, thereby throwing the corners sharply against the separators. The result is that the buckled plate then cuts through what remains of the separator and renders the cell inactive on account of short circuiting. By the employment of my invention any vibration which occurs will cause the entire cell to vibrate in complete unison, thereby eliminating unnecessary wear on the separators. Plate buckling is further prevented due to the provision of a support at the exact place where all plates of this kind tend to buckle, which is at the center. The center of the plate being the weakest place naturally means that it will buckle there first. Therefore, by placing a support at the center of the plate this weakness is overcome and the entire plate is greatly strengthened.

The full objects and advantages of my invention will appear in connection with the detailed description thereof, and the novel features of my inventive idea will be particularly pointed out in the claim.

In the accompanying drawings, which illustrate the application of my invention in two slightly different forms,—

Fig. 1 is an elevational view showing a complete cell element having my invention applied thereto. Fig. 2 is an elevational view of one of the separators. Fig. 3 is a view on an enlarged scale in section on the line 3—3 of Fig. 1. Fig. 4 is a fragmentary view corresponding to Fig. 3 but showing a slight modification.

Referring to the construction shown in the drawings, the numeral 10 is employed to designate the positive plates and the numeral 12 to designate the negative plates of a storage battery cell, while the separators are designated by the numeral 14. As shown, the plates are in the customary form of grids with paste between the grids. The plates are surrounded by frame portions 16, the frames of the positive plates being connected by a strap 18 which carries a post 20, and the frames of the negative plates being connected by a strap 22 which carries a post 24.

It will be understood as a matter of course that the complete unit when assembled in the customary manner is placed in a jar containing an electrolyte. The plates and separators are provided with centrally-disposed holes, the hole in the separator shown in Fig. 2 being designated 26. The holes in the two outside plates are larger than the holes in the other plates and are formed by inclined lead rings 28 and 30, which may be conveniently cast with the plates. The rings 28 and 30, respectively, receive the inclined heads 32 and 34 of two cooperating bolt members 36 and 38, the inner end of the member 38 having an internally-threaded socket 40, receive threads on the inner end of the member 36. The bolt members are made of non-conducting material such as celluloid, glass or amber. In the form shown in Fig. 4 there is a one-part bolt 44 having a head 32' at one end engaging the ring 28', and at the other end having a reduced threaded portion 46 which engages internal threads through the ring 30'. It will be noted that the rings in the two outside plates are placed at their weakest place, and that pressure is distributed over a large area, which further tends to eliminate the possibility of buckling of the plates.

I claim:

In a storage battery cell, the combination of positive and negative plates, separators for said plates, lead rings cast in place at the centers of the two outside plates, said rings having outwardly inclined openings therein, and two cooperating bolt members of non-conducting material having screw-threaded engagement with each other at their adjacent ends, said bolt members passing centrally through all of the plates and separators and having inclined heads which fit into said inclined openings.

In testimony whereof I hereunto affix my signature.

ALFRED P. WOOD.